US00RE35815E

United States Patent [19]

Landry

[11] E Patent Number: Re. 35,815

[45] Reissued Date of Patent: Jun. 2, 1998

[54] METHOD FOR TREATING WASTE MATERIAL

[75] Inventor: Kenneth C. Landry, Novato, Calif.

[73] Assignee: Landry Service Company, Inc., Bacliff, Tex.

[21] Appl. No.: 296,533

[22] Filed: Aug. 26, 1994

Related U.S. Patent Documents

Reissue of:

[64] Patent No.: 4,897,205
Issued: Jan. 30, 1990
Appl. No.: 215,265
Filed: Jul. 5, 1988

U.S. Applications:

[63] Continuation-in-part of Ser. No. 99,076, Sep. 21, 1987, abandoned, which is a continuation of Ser. No. 882,412, Jul. 7, 1986, abandoned.

[51] Int. Cl.[6] ..... B01D 17/00

[52] U.S. Cl. ..... 210/766; 210/773; 210/774; 210/785; 134/22.18; 134/22.19; 134/40

[58] Field of Search ..... 210/747, 749, 210/766, 768, 772, 773, 774, 780, 785; 134/5, 22.14, 22.15, 22.18, 22.19, 30, 40

[56] References Cited

U.S. PATENT DOCUMENTS

| | | | |
|---|---|---|---|
| 1,722,211 | 7/1929 | Guardino . | |
| 3,790,476 | 2/1974 | Spoerle et al. | 210/47 |
| 3,929,586 | 12/1975 | Slikkers, Jr. | 210/774 |
| 3,956,116 | 5/1976 | Brandt | 210/42 |
| 4,093,542 | 6/1978 | Dahmen et al. | 210/54 |
| 4,112,357 | 9/1978 | Clements et al. | 210/774 |
| 4,191,588 | 3/1980 | Keyworth et al. | 134/22.19 |
| 4,260,489 | 4/1981 | Grieg et al. | 210/772 |
| 4,303,532 | 12/1981 | Smelley et al. | 210/732 |
| 4,330,450 | 5/1982 | Lipowski et al. | 524/547 |
| 4,395,338 | 7/1983 | Rowton | 210/774 |
| 4,447,332 | 5/1984 | Crisman et al. | 210/771 |
| 4,537,685 | 8/1985 | Kennedy, III et al. | 210/709 |
| 4,592,786 | 6/1986 | Williams et al. | 134/40 |

OTHER PUBLICATIONS

*Manual on Disposal of Refinery Wastes*, vol. VI, Solid Wastes, American Petroleum Institute, Division of Refining, New York, NY, 1963.

"Large–Scale Dewatering of Phosphatic Clay Waste From Central Florida" by B. J. Schiner, Annie G. Smelley, and D. R. Brooks–Bureau of Mines Report of Investigations/1982 RI 8611, 1982.

*Primary Examiner*—Thomas G. Wyse
*Attorney, Agent, or Firm*—Vaden, Eickenroht & Thompson, L.L.P.

[57] ABSTRACT

Preheated diluent and steam are introduced into a container containing waste material typically comprised of a sludge mixture of liquid and solid material including hydrocarbons. The material is thereby heated and its viscosity reduced to form a pumpable slurry. The slurry is pumped out of the container and its viscosity is adjusted to the optimum for separating the solids and liquids. The solids are then separated from the liquid, any valuable material in either the solids and the liquid are recovered and the rest disposed of.

3 Claims, 2 Drawing Sheets

METHOD FOR TREATING WASTE MATERIAL

Matter enclosed in heavy brackets [ ] appears in the original patent but forms no part of this reissue specification; matter printed in italics indicates the additions made by reissue.

BACKGROUND OF THE INVENTION

This is a continuation-in-part of application Ser. No. 07/099,076, filed Sept. 21, 1987, now abandoned which is a continuation of application Ser. No. 06/882,412, filed July 7, 1986, now abandoned.

This invention relates to the treatment of waste material. In one aspect the invention relates to a method of and apparatus for removing solid and liquid mixtures, i.e., sludge, from various containers and the subsequent separation thereof.

In yet another specific aspect, the invention relates to the removal and separation of liquid hydrocarbons and solids, such as catalyst fines, which co-mingle and settle as a sludge to the bottom of storage tanks.

In the petrochemical industry and other industries, vast quantities of waste material, both solid and liquid in combination, are produced by various processes, the sludge accumulates in storage containers such as tanks, vats, ponds, and the like. In typical applications of the subject invention, situations are encountered where the sludge is a solid at ambient temperatures. This is particularly common for sludges containing a high percentage of catalyst fines.

At some point in time in the production cycle, it is necessary to clean out the container by removal of the sludge. Thus, methods and apparatus have long been known in the art for attempting to efficiently remove such material while at the same time seeking to retain any valuable materials in the sludge for re-use.

A principal technique for cleaning out these industrial containers has been to vacuum out as much material as possible with a vacuum truck or other such apparatus. Thereafter, workmen enter the container to remove the remaining material with shovels, buckets, etc. In some instances when most of the material has solidified, an aperture is cut into the tank, vessel, or other container, whereupon mechanical equipment such as a front-end loader or the like is used to remove the remaining material.

Several serious drawbacks exist with such methods and apparatus. First, the techniques are extremely labor intensive and the conditions are frequently dangerous under which the individuals must work. Also, when the waste material is thereby removed and disposed of, valuable residual material is lost. Still further, particularly when a substantial amount of material has become solid, removal of this material, often under difficult and hazardous conditions within a tank, is extremely difficult. Still further, the volume of material that is disposed of is typically unnecessarily high in that otherwise re-cyclable material is thereby lost, adding to the cost and difficulty of the cleaning operation due to the highly restrictive and costly modern constraints on waste disposal in volume.

Yet an additional technique employed frequently in petroleum related processes, involves the flooding of the tank with water or the like, whereupon the liquid hydrocarbons rise to the surface of the water where they can be collected. Whereas in this technique an effort is made to avoid the aforementioned waste of valuable materials in that valuable hydrocarbons are sought to be reclaimed from the liquid, such material remaining in the solid matter left behind is nevertheless disposed of, which can often include a surprising volume of useful material. Moreover, the aforementioned difficult problem still remained of evacuating the solid material left behind.

Accordingly, a novel method and apparatus was long sought after in the waste removal, treatment, and disposal industry that was safe, efficient, reduced man-power and the volume of solids required for disposal while at the same time providing for recapture of valuable materials. These and other objects have been provided in the novel subject invention that overcame the hereinbefore described problems of other techniques as well as others.

SUMMARY OF THE INVENTION

Diluent, such as diesel or light crude oil, is pumped from a storage tank to a heating vat where it is heated to about 20 degrees Fahrenheit below the lowest flash point of the material or sludge to be removed or the diluent, whichever is the lowest. The heated diluent is then pumped to the container to be cleaned. More particularly, the container, in a preferred embodiment, has disposed therein a wash manifold preferably internal of and central to the container. The heated diluent is delivered to such manifold where it is directed against the sludge through one or more ports in the manifold or through one or more hoses connected to the port or ports.

Steam is also directed against the sludge from steam lines or hoses extending into the container. Normally, the steam and hot diluent are directed toward the same portion of sludge. The steam and diluent convert the sludge into a slurry containing the solid particles, having a viscosity that will allow the slurry to be readily pumped out of the container.

Outside the container, additional steam and heated diluent are added to the slurry in functional relation to the particular characteristics of the waste material in the slurry to give the slurry the proper viscosity for optimum separation of the solids from the liquid. The sludge carrying slurry is then pumped to a separator where the liquid is separated from the solids.

The separated solids are deposited in a solids box for subsequent transfer to a disposal site. The remaining liquid material is pumped from the separator to a recovery tank or back to the diluent storage tank to be reused. Eventually, the liquid goes to the recovery tank. The liquid will be made up of the diluent, the water from the steam, and whatever hydrocarbons are separated from the solid portion of the sludge. The hydrocarbons can be separated from the water and salvaged.

The structure of the present invention as well as the features, advantages, benefits, and objects thereof over other designs known in the art may be better understood with reference to the following detailed description in conjunction with the drawings, wherein:

Figure 1:
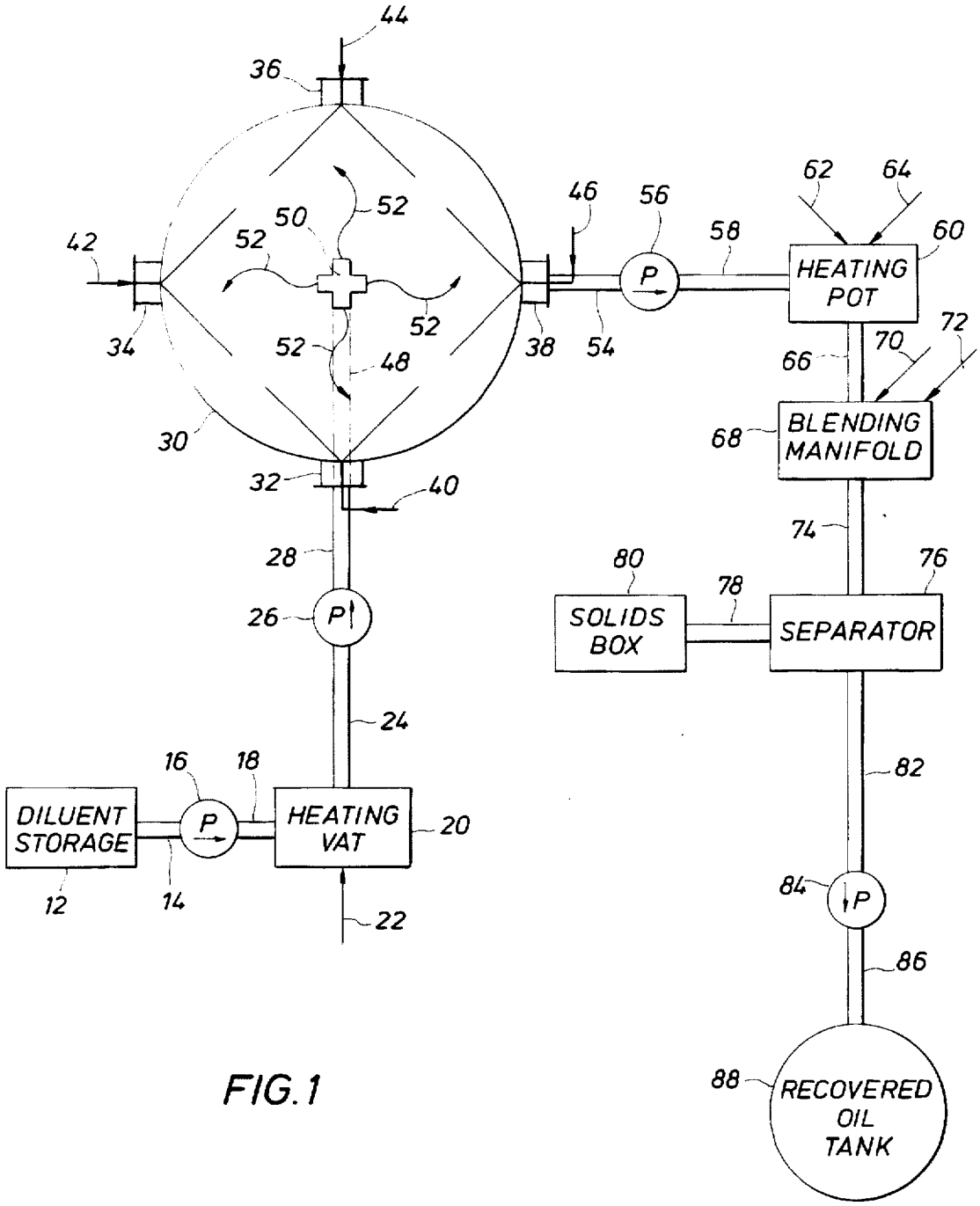
FIG. 1 is a schematic illustration of one embodiment of the apparatus for practicing the method of the present invention.

The apparatus in the form depicted in the drawings are for separating and removing hydrocarbons, such as oil or the like, and the solids, which are co-mingled in a sludge, from tanks, ponds, pits, vessels, and other containers. The teachings of the present invention, however, are equally applicable to non-petrochemical applications where it is desirable to remove solid waste material and reclaim other chemicals from a storage container and accordingly it is not intended that the invention be limited to the removal of waste and the subsequent separation of merely hydrocarbons from the solids.

In typical applications of the subject invention, situations are encountered wherein at ambient temperature sludge has solidified (i.e., the temperature is below the pour point of the liquid in the sludge) in a container such as a pond, pit, tank, or other vessel, depicted in FIG. 1 generally as tank 30. It is accordingly desirable to provide means for evacuating the tank 30 of the sludge, including the solid material.

Thus, the apparatus of FIG. 1 includes storage tank 12 that contains a diluent selected to dilute the liquid in the sludge and form a pumpable slurry that will support the solids in suspension. A representative such material found to be effective in many petrochemical applications is diesel fuel or light crude oil. The diluent is pumped through pipe 14 by means of any appropriate pump 16 through pipe 18 to a heating vat 20 in which steam is being injected (shown schematically as arrow 22). When the diluent has thereby been heated to the desired temperature, it is pumped through pipe 24 by means of centrifugal pump 26 and from pump 26 through pipe 28 to manway 32 extending through the wall of tank 30.

Still referring to FIG. 1, an internal conduit 48 is shown internally of tank 30 terminating in wash manifold 50, which connects pipe 28 and manifold 50. The manifold is basically comprised of a termination with a plurality of apertures whereby when the heated diluent is delivered to the manifold, it is ejected under pressure through the apertures and against the walls of tank 30 in various radial directions shown by arrows 52. In a preferred embodiment, manifold 50 is located generally in the center of tank 30.

Alternatively, particularly in large storage tanks, hoses 52 will be connected to the manifold through which workmen can direct the diluent against selected portions of the sludge, converting it to a slurry, and moving on to another portion.

In addition to heated diluent, steam may be injected into tank 30 to heat the sludge and to maintain the slurry formed at a proper temperature for pumping. Accordingly, a plurality of distribution headers or spargers (not shown) are provided, each for one of manways 34, 36, and 38. The purpose of the spargers is to distribute steam, as shown by arrows 40, 42, 44, and 46, into the tank in a dispersal pattern such as that shown by the lines forming a square therein. Although the steam source and conduits to deliver such steam at the locations shown by the arrows has not been depicted, this may be effected in a number of ways well known in the art. Again, in large tanks, the steam will be supplied to hoses that can be directed by workmen against the same portion of the sludge receiving the heated diluent.

As the slurry of liquid and solids is formed, second pump 56 pumps the slurry from the tank. More particularly, such material is pumped through pipe 54 by means of pump 56 through pipe 58 to heating pot 60.

The purpose of pot 60 is to maintain the pumpability of the slurry that usually must be pumped to a location somewhat removed from the tank for further treatment as will be described hereinafter. Accordingly, as schematically illustrated by arrows 62 and 64, steam and additional heated diluent, respectively, are introduced in the heating pot 60 as required to maintain the slurry at the proper viscosity. The pot may be located 100 yards or more from tank 30 so long as the flow of material in the piping is maintained.

From the heating pot 60, the slurry is pumped through pipe 66 to blending manifold 68, the purpose of which is to make any final adjustments in the temperature and viscosity of the slurry by steam addition (shown by arrow 70) and/or heated diluent (shown by arrow 72) for optimum solids separation.

With further reference to blending manifold 68, when the material in the manifold is at the desired temperature and viscosity, it is pumped through pipe 74 to separator 76. The separator in this embodiment is a vibrating screen having two sections of screen cloth in series, the first of which is disposed in a generally horizontal position while the following screen is inclined at about a 5 degree angle from the horizontal. The purpose of this incline is to permit maximum retention of waste material on the screen temporarily to insure that maximum separation of the liquid phase contained therein occurs prior to the solids separated by the screens being deposited through pipe 78 to solids box 80. The liquid phase, in turn, is pumped by means of pump 84 through pipe 82 and pipe 86 into recovered oil tank 88. Solids contained in box 80 are transferred to a disposal site by conventional means. It will be appreciated that the screen mesh size may be determined in a conventional manner known in the art from laboratory testing of samples of the pumped waste material for particle sizes in order to enhance the solid and liquid separating function of separator 76. Moreover, as aforesaid, it will be recalled that the temperature of the diluent, and volume thereof, as well as the volume of steam employed introduced at locations proximate to reference numbers 40–46, 50, 62–64, and 70–72, may all be adjusted as desired to facilitate maximum pumpability of the slurry containing the waste material as well as separability of the solids and liquid phases of the material.

Figure 2:
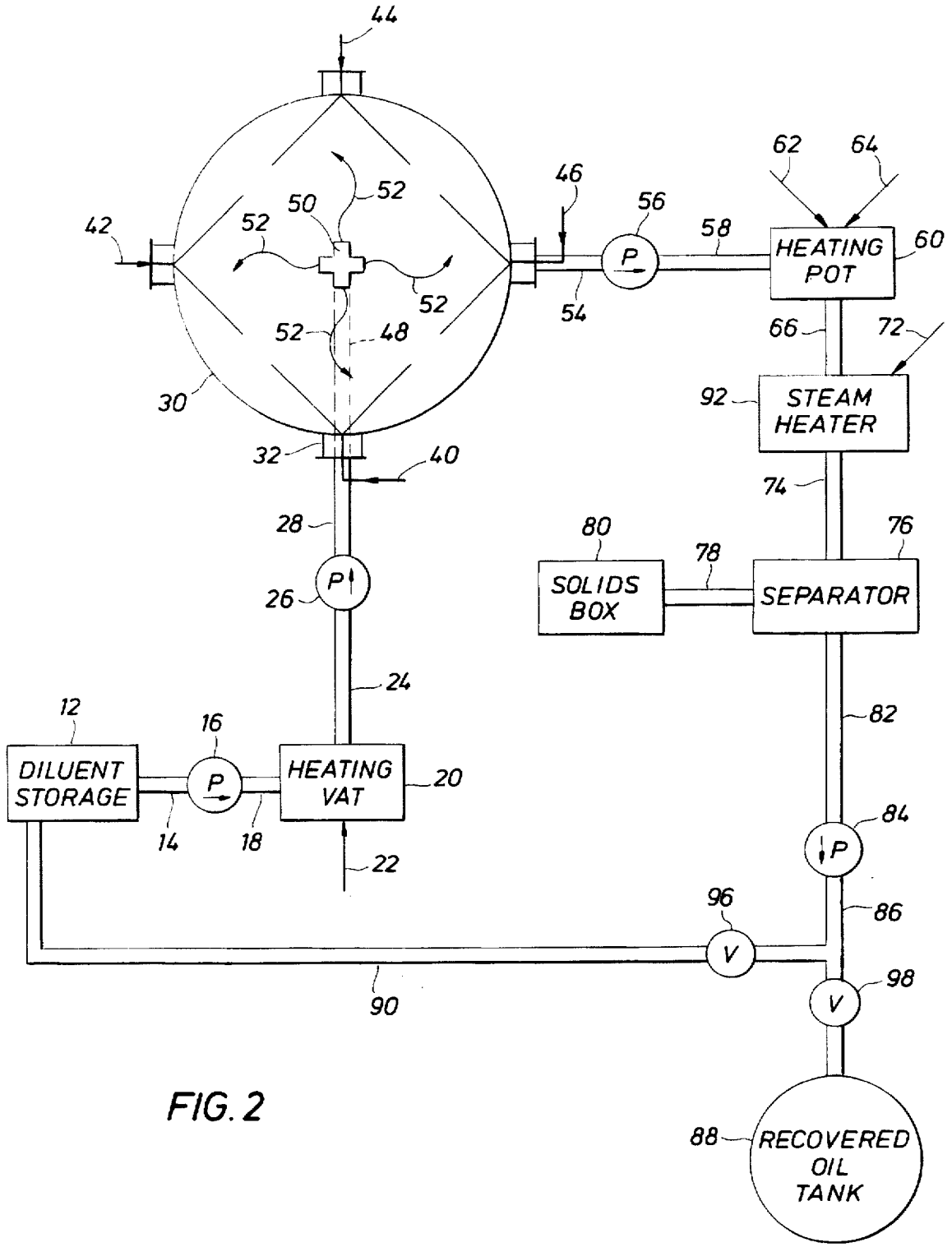
FIG. 2 is a schematic illustration of another embodiment of the apparatus for practicing the method of this invention.

When the waste material consists of an extremely fine solids such as catalyst fine, a slightly different arrangement of apparatus is used. This apparatus is shown in FIG. 2. Basically, all the equipment is the same and in those instances the numbers given in FIG. 1 will continue to be used in FIG. 2. The main difference is the replacement of the blending manifold of FIG. 1 with steam heater 92. Arrow 72 indicates the steam being supplied to the steam heater. When removing catalyst fines, additional diluent at this point is not required in most cases. Diluent can be added at this point if required.

The other change in the system from the FIG. 1 apparatus is that separator 94 is a centrifugal separator rather than the screen shaker type of separator 76 as used in FIG. 1. The centrifugal separator is required to separate the extremely fine particles of the waste material from the liquid. Obviously, if the solid portion of the sludge is made of fines that are 50 microns or less, it would be difficult to screen them out of the liquid. In fact, in some cases, it may be necessary to use the screens to take out the large particles, say 50 microns and above, and then have a centrifugal separator downstream to remove the very fine solids.

Another change in FIG. 2 from FIG. 1 is the addition of line 90 through which the diluent can be returned to diluent storage rather than sending it directly to the recovered oil tank. This allows the operator to recycle the diluent and the water from the steam until it reaches a point where it is too contaminated with water and hydrocarbons picked up from the sludge to do an adequate job. At that time, the operator can close valve 96 and open valve 98 and pump contaminated diluent straight to the recovered oil tank.

Several features of the present invention may now be noted. First, the agitating and motivating effect of the steam and heated diluent makes possible the pumping of solids material contained within the tank 30. This is significant for several reasons. In the prior art, it has been convention to simply remove the solids material from within the tank 30 for disposal. However, in many processes this solid material contains valuable liquids suitable for recycling which are otherwise lost. By heating the solids within tank 30 according to the present method and apparatus, not only are these solids rendered pumpable, simplifying their removal in a more safe and efficient manner, but because of this they enter the portion of the system that can recapture these materials from the waste. Moreover, many of these valuable liquid materials are in a solid form in ambient temperature conditions, and by introduction of heat in the diluent and steam, they are brought from a solid phase to a liquid phase for recapture and recycling. It has been found in some applications that the volume of solid waste material from box 80, that must be disposed of may be reduced by as much as 95%, which, in addition to the recapture of hydrocarbons from tank 88, is valuable in itself in terms of cost savings, availability of disposal sites, and the like.

It is apparent that the present invention is one well adapted to obtain all of the advantages and features hereinabove set forth, together with other advantages which will become apparent from the description of the apparatus and method. Moreover, the foregoing disclosure and description of the invention are only illustrative and explanatory thereof and admit of various changes in size, shape, and material composition of components and details of illustrated construction without departing from the scope and spirit thereof.

What is claimed is:

[1. A method for removing waste material having solid and liquid phase components from a container and separating said components, comprising:

heating a diluent;

injecting a first quantity of steam and said diluent into said container in an amount sufficient to cause a portion of said solid phase to flow;

establishing a flow of a portion of said liquid phase and said portion of said solid phase of said waste material from said container;

injecting a second quantity of steam and said diluent into said flow of waste material in an amount sufficient to maintain said flow;

separating said liquid and said solid phases of said waste material from said flow of said waste material; and collecting volumes of said liquid and said solid phases of said waste material from said separated liquid and solid phases.]

[2. The method of claim 1 in which the liquid and solids of said waste material are separated by centrifugal force.]

[3. The method of claim 1 wherein said first quantity of said steam and said diluent are injected directly against said waste material.]

[4. The method of claim 3 further including the step of:

injecting a third quantity of steam and said diluent into said flow of waste material injected with said second quantity of said steam and diluent.]

[5. The method of claim 4 wherein said third quantity of said steam and diluent is in an amount functionally related to said waste material in said container to optimize said separating of said liquid and solid phases.]

[6. The method of claim 5 wherein said step of separating said liquid and solid phases comprises:

introducing said flow of said waste material through a screen disposed at a preselected angle relative to horizontal; and vibrating said screen.]

[7. The method of claim 6 wherein said angle is about five degrees, and wherein said step of collecting said liquid and solid phases comprises:

collecting as said liquid phase material which flows through said screen; and collecting as said solid phase material which flows off said screen.]

[8. The method of claim 7 wherein:

said step of injection of said second quantity of said steam and said diluent is adjacent said container; and wherein said step of injection of said third quantity of said steam and diluent, said separating and collecting of said solid and liquid phases is remotely of said container relative to said step of injecting said second quantity of steam and diluent.]

[9. The method of claim 1 wherein said step of injecting a first quantity of said heated diluent is at a generally central location within said container.]

[10. The method of claim 1 wherein said step of injecting a first quantity of said steam is at a plurality of locations disposed radially outwards of and about said central location and within said container.]

[11. The method of claim 10 wherein said waste material includes at least one hydrocarbon; and wherein said diluent is heated to a temperature no higher than about twenty degrees Fahrenheit less than the flash point of the hydrocarbon in said at least one hydrocarbon having the lowest flash point.]

[12. A method of removing and separating liquid hydrocarbons and solids that have settled as sludge to the bottom of a container comprising injecting liquid diluent in which the hydrocarbons are soluble into the container and heating the sludge to convert the sludge into a pumpable slurry of diluted liquids and suspended solids, pumping the slurry out of the tank, adding heat as required to adjust the viscosity of the slurry for separation of the solids from the liquids in the slurry, and separating the solids from the liquid.]

[13. The method of claim 12 in which adding heat includes adding additional heated diluent.]

[14. The method of claim 12 in which the diluent is heated to a temperature just below the lowest flash point temperature of the material making up the sludge or the flash point of the diluent, whichever is the lower.]

[15. The method of claim 12 in which the solids are separated from the liquid by centrifugal force.]

*16. A method for removing waste material having solid and liquid phase components from a container and separating said components, comprising: heating a diluent; injecting a first quantity of steam and said diluent into said container directly against said waste material in an amount sufficient to cause a portion of said solid phase to flow; establishing a flow of a portion of said liquid phase and said portion of said solid phase of said waste material from said container; injecting a second quantity of steam and said diluent into said flow of waste material in an amount sufficient to maintain said flow; injecting a third quantity of said steam and said diluent into said flow of waste material injected with said second quantity of said steam and diluent, said steam and diluent being in an amount functionally related to said waste material in said container to optimize said separating of said liquid and solid phases; separating said liquid and said solid phases of said waste material from*

*said flow of said waste material by centrifugal force; and collecting volumes of said liquid and said solid phases of said waste material from said separated liquid and solid phases.*

*17. A method of removing and separating liquid hydrocarbons and solids that have settled as sludge to the bottom of a container comprising injecting liquid diluent in which the hydrocarbons are soluble into the container and heating the sludge to convert the sludge into a pumpable slurry of diluted liquids and suspended solids, pumping the slurry out of the tank, adding steam as required to adjust the viscosity of the slurry for separation of the solids from the liquids in the slurry, and separating the solids from the liquid by centrifugal force.*

*18. A method of removing sludge from a tank containing fine solid particles of catalyst and hydrocarbons comprising introducing a diluent and heating the sludge so as to create a pumpable slurry, pumping the slurry out of the tank, maintaining the desired viscosity of the slurry with further diluent and heating, and separating the solids from the liquids in the slurry by use of a centrifuge while injecting live steam into the slurry between the feed pump to the centrifuge and the centrifuge.*

* * * * *